(12) United States Patent
Bonomi et al.

(10) Patent No.: US 10,979,368 B2
(45) Date of Patent: Apr. 13, 2021

(54) ARCHITECTURE FOR CONVERGED INDUSTRIAL CONTROL AND REAL TIME APPLICATIONS

(71) Applicant: Nebbiolo Technologies, Inc., Milpitas, CA (US)

(72) Inventors: Flavio Bonomi, Palo Alto, CA (US); Kannan Devarajan, Cupertino, CA (US)

(73) Assignee: Nebbiolo Technologies, Inc., Milpitas, CA (US)

( * ) Notice: Subject to any disclaimer, the term of this patent is extended or adjusted under 35 U.S.C. 154(b) by 0 days.

(21) Appl. No.: 16/053,330

(22) Filed: Aug. 2, 2018

(65) Prior Publication Data

US 2019/0044894 A1 Feb. 7, 2019

Related U.S. Application Data

(60) Provisional application No. 62/540,502, filed on Aug. 2, 2017.

(51) Int. Cl.
*H04L 12/861* (2013.01)
*H04L 1/18* (2006.01)
(Continued)

(52) U.S. Cl.
CPC ...... *H04L 49/9068* (2013.01); *G06F 9/45558* (2013.01); *H04L 1/1887* (2013.01);
(Continued)

(58) Field of Classification Search
CPC ..... G06F 9/00; G06F 9/06; G06F 9/44; G06F 9/455; G06F 9/45533; G06F 9/45558;
(Continued)

(56) References Cited

U.S. PATENT DOCUMENTS

| 5,630,053 A | 5/1997 | Morikawa |
| 6,370,656 B1 | 4/2002 | Olarig |

(Continued)

FOREIGN PATENT DOCUMENTS

| EP | 2800303 A1 | 11/2014 |
| WO | WO2016018332 A1 | 2/2016 |

(Continued)

OTHER PUBLICATIONS

"International Search Report" and "Written Opinion of the International Searching Authority," Patent Cooperation Treaty Application No. PCT/US2017/023898, dated Jun. 19, 2017, 16 pages.

(Continued)

*Primary Examiner* — Boris D Grijalva Lobos
(74) *Attorney, Agent, or Firm* — Barry Choobin; Patent 360LLC (57) ABSTRACT

Provided herein are exemplary systems and methods for an architecture for converged industrial control and real time applications, the architecture comprising a physical network port, a switching module, an embedded ARM core, a network interface controller, and a multi-core computing module. According to further exemplary embodiments, the physical network port is an ethernet port capable of supporting a real-time field bus. The switching module may be configured to support a multiport ethernet switch. The switching module may also be configured to enable a backplane mesh to interconnect multiple foglets. Additionally, the embedded ARM core may be within the switching module, and the embedded ARM core may be configured to support virtualization.

14 Claims, 7 Drawing Sheets

(51) Int. Cl.
*H04L 29/06* (2006.01)
*H04L 12/841* (2013.01)
*H04L 12/875* (2013.01)
*G06F 9/455* (2018.01)

(52) U.S. Cl.
CPC .............. *H04L 47/28* (2013.01); *H04L 47/56* (2013.01); *H04L 69/12* (2013.01); *G06F 2009/45583* (2013.01); *G06F 2009/45595* (2013.01)

(58) Field of Classification Search
CPC ..... H04L 1/00; H04L 1/12; H04L 1/16; H04L 1/18; H04L 1/1848; H04L 1/1858; H04L 1/1887; H04L 47/00; H04L 47/10; H04L 47/28; H04L 47/50; H04L 47/58; H04L 49/00; H04L 49/90; H04L 49/9063; H04L 49/9068; H04L 69/00; H04L 69/12
See application file for complete search history.

(56) References Cited

U.S. PATENT DOCUMENTS

| | | | |
|---|---|---|---|
| 6,763,479 B1 | 7/2004 | Hebert | |
| 7,657,659 B1* | 2/2010 | Lambeth | G06F 9/45558 370/471 |
| 7,894,480 B1* | 2/2011 | Wang | H04L 63/0263 370/392 |
| 8,605,757 B2* | 12/2013 | Fourcand | H04J 3/0667 370/535 |
| 8,644,352 B1* | 2/2014 | Hutchison | H04J 3/065 370/509 |
| 8,665,884 B2* | 3/2014 | Hall | H04L 43/106 370/397 |
| 8,767,747 B2* | 7/2014 | Kulkarni | H04L 47/245 370/395.42 |
| 8,806,025 B2* | 8/2014 | Hummel | G06F 13/4022 709/227 |
| 8,837,492 B2* | 9/2014 | Fourcand | H04L 47/10 370/395.4 |
| 8,930,568 B1* | 1/2015 | Chalmer | G06F 13/10 709/232 |
| 9,755,978 B1* | 9/2017 | Mogul | H04L 47/2441 |
| 9,842,013 B2 | 12/2017 | Arjun et al. | |
| 9,971,619 B2* | 5/2018 | Karnes | H04L 43/12 |
| 10,218,628 B2* | 2/2019 | Bush | H04L 47/27 |
| 10,270,567 B1* | 4/2019 | Rang | B64C 13/503 |
| 10,432,536 B1* | 10/2019 | Subramanian | H04L 47/2475 |
| 10,492,160 B2* | 11/2019 | Ruffini | H04W 56/0045 |
| 10,541,934 B1* | 1/2020 | Subramanian | H04L 47/6215 |
| 2002/0156888 A1 | 10/2002 | Lee et al. | |
| 2003/0131177 A1 | 7/2003 | Ng | |
| 2004/0128370 A1 | 7/2004 | Kortright | |
| 2004/0205388 A1 | 10/2004 | Nakano | |
| 2005/0132102 A1* | 6/2005 | Huggahalli | G06F 12/0835 710/36 |
| 2005/0144309 A1* | 6/2005 | Gish | H04L 47/263 709/233 |
| 2006/0013133 A1* | 1/2006 | Peng | H04L 47/762 370/230 |
| 2006/0206602 A1 | 9/2006 | Hunter et al. | |
| 2008/0250042 A1 | 10/2008 | Mopur et al. | |
| 2008/0313420 A1* | 12/2008 | Beckmann | G06F 12/1054 711/207 |
| 2009/0070617 A1 | 3/2009 | Arimilli et al. | |
| 2010/0070710 A1* | 3/2010 | Arimilli | G06F 12/0835 711/122 |
| 2010/0082811 A1 | 4/2010 | Van Der Merwe et al. | |
| 2011/0022773 A1* | 1/2011 | Rajamony | G06F 12/084 711/3 |
| 2012/0020249 A1* | 1/2012 | Sundararaman | H04L 47/621 370/256 |
| 2012/0026898 A1 | 2/2012 | Sen et al. | |
| 2012/0042095 A1* | 2/2012 | Kotha | G06F 11/1423 709/233 |
| 2012/0324442 A1 | 12/2012 | Barde | |
| 2013/0067466 A1* | 3/2013 | Combs | G06F 9/455 718/1 |
| 2013/0185474 A1* | 7/2013 | Ge | G06F 9/544 711/6 |
| 2013/0237268 A1 | 9/2013 | Teng et al. | |
| 2013/0332676 A1* | 12/2013 | Kotla | G06F 12/0895 711/129 |
| 2014/0006594 A1 | 1/2014 | Gabriel | |
| 2014/0032173 A1 | 1/2014 | Kida et al. | |
| 2014/0136952 A1 | 5/2014 | Zhu et al. | |
| 2014/0149981 A1* | 5/2014 | Luxenberg | H04L 49/9005 718/1 |
| 2014/0215463 A1* | 7/2014 | Hendel | G06F 9/45533 718/1 |
| 2014/0330925 A1 | 11/2014 | Lee et al. | |
| 2014/0380488 A1 | 12/2014 | Datta Ray et al. | |
| 2015/0006733 A1 | 1/2015 | Khan et al. | |
| 2015/0063369 A1 | 3/2015 | Lida et al. | |
| 2015/0092530 A1* | 4/2015 | Kelsey | H04W 40/244 370/216 |
| 2015/0094868 A1 | 4/2015 | Diab et al. | |
| 2015/0153175 A1 | 6/2015 | Skaaksrud | |
| 2015/0249586 A1 | 9/2015 | Byers et al. | |
| 2015/0271642 A1 | 9/2015 | Raymond et al. | |
| 2015/0295829 A1* | 10/2015 | Palmhager | H04L 69/08 709/217 |
| 2015/0317835 A1 | 11/2015 | Byers | |
| 2016/0036707 A1 | 2/2016 | Mestery et al. | |
| 2016/0112182 A1* | 4/2016 | Karnes | G06F 1/14 375/362 |
| 2016/0124819 A1 | 5/2016 | Killadi et al. | |
| 2016/0162299 A1 | 6/2016 | Ali et al. | |
| 2016/0182639 A1 | 6/2016 | Hong et al. | |
| 2016/0210209 A1 | 7/2016 | Verkaik et al. | |
| 2016/0283283 A1* | 9/2016 | Jung | G06F 9/5033 |
| 2016/0359887 A1* | 12/2016 | Yadav | H04L 61/1511 |
| 2017/0116097 A1 | 4/2017 | Keremane et al. | |
| 2017/0171112 A1* | 6/2017 | Saint-Etienne | H04L 12/4625 |
| 2017/0277173 A1 | 9/2017 | Bonomi et al. | |
| 2018/0006956 A1* | 1/2018 | Bush | H04Q 9/00 |
| 2018/0060142 A1* | 3/2018 | Skeffington | H04L 67/325 |
| 2018/0063020 A1 | 3/2018 | Bhagavatula et al. | |
| 2018/0115457 A1 | 4/2018 | Bonomi et al. | |
| 2018/0115519 A1 | 4/2018 | Bonomi et al. | |
| 2018/0159745 A1* | 6/2018 | Byers | H04L 43/08 |
| 2018/0183901 A1* | 6/2018 | Lariviere | H04L 69/08 |
| 2018/0191629 A1* | 7/2018 | Biederman | H04W 72/0446 |
| 2018/0191632 A1* | 7/2018 | Biederman | H04L 69/22 |
| 2018/0237039 A1 | 8/2018 | Mong | H04L 67/12 |
| 2018/0295052 A1* | 10/2018 | St-Laurent | H04L 47/34 |
| 2018/0302330 A1* | 10/2018 | Bush | H04L 47/27 |
| 2018/0322913 A1* | 11/2018 | Friedman | G06F 12/0653 |
| 2018/0324001 A1* | 11/2018 | Tyagi | H04L 12/4645 |
| 2018/0365176 A1* | 12/2018 | Finkelstein | G06F 13/36 |
| 2019/0014041 A1* | 1/2019 | Schwindt | H04L 63/1425 |
| 2019/0109797 A1* | 4/2019 | Thubert | H04L 47/34 |
| 2019/0124006 A1* | 4/2019 | Thubert | H04L 47/12 |
| 2019/0251257 A1* | 8/2019 | McKeen | G06F 12/1491 |
| 2019/0254057 A1* | 8/2019 | Hampel | H04W 72/1289 |

FOREIGN PATENT DOCUMENTS

| | | |
|---|---|---|
| WO | WO2017132320 A1 | 8/2017 |
| WO | WO2017165701 A1 | 9/2017 |
| WO | WO2018044737 A1 | 3/2018 |
| WO | WO2018075546 A1 | 4/2018 |

OTHER PUBLICATIONS

"International Search Report" and "Written Opinion of the International Searching Authority," Patent Cooperation Treaty Application No. PCT/US2017/048751, Nov. 6, 2017, 9 pages.

"International Search Report" and "Written Opinion of the International Searching Authority," Patent Cooperation Treaty Applica- (56) References Cited

OTHER PUBLICATIONS tion No. PCT/US2017/057027, dated Feb. 14, 2018, 13 pages.
Bonomi et al., "Fog computing: A platform for Internet of things and analytics," In: Big Data and Internet of Things: A Roadmap for Smart Environments [online], Mar. 12, 2014, Retrieved from the Internet: <URL:https://pdfs.semanticscholar.org/5fe4/c23964c165f42b4e0cd98bf686d04501e628.pdf>, 22 pages.
Ginter, Andrew, "An IT Perspective of Control Systems Security," Industrial Defender [online], Oct. 2009, Retrieved from the Internet: <URL:https://www.controlglobal.com/assets/Media/Whitepapers/2010/100223_IndustrialDefender_ControlSystemSecurity.pdf>, 9 pages.
Szefer, Jakub et al., "Eliminating the hypervisor attack surface for a more secure cloud," Researchgate [online], Oct. 21, 2011, Retrieved from the Internet: <URL:https://www.cs.princeton.edu/~jrex/papers/ccs11.pdf>, 12 pages.
Palekar, Ashwin, "Network Isolation Options for Machines in Windows Azure Virtual Networks," [online], Mar. 28, 2014, Retrieved from the Internet: <URL:https://azure.microsoft.com/en-us/blog/network-isolation-options-for-machines-in-windows-azure-virtual-networks/>, 65 pages.
"International Search Report and Written Opinion", Patent Cooperation Treaty Application No. PCT/US2017/015045, dated Apr. 26, 2017, 15 pages.
Holloway, Talor, "IBM PowerHA 7.1 heartbeat over SAN," Jan. 21, 2013, https://www.ibm.com/developerworks/aix/library/auaix-powerha-heartbeatlindex. Html.
Singh, Suman Kumar, Loderup, Morten, Noman, Farrukh, "Building High-Availabiltiy Clusters," Oct. 2004, http://www.dell.com/down loads/g lobal/power/ps4q04-20040 151 -sing h .pdf.
Cisco, "Cisco Nexus 7000 Series Supervisor Module;" 1992, http://www.floralimited.com/Files/Products/CISCO/BrochureUrl/Cisco_7000_Supervisor_Module(2).pdf.
Rajabali, Taha, "How to Increase System Availabiity without Redundancy;" Dec. 8, 2013, https://web.archive.org/web/20131208193132/https://www.bastiansolutions.com/blog/index.php/2013/04/19/how-to-increasesystem-availability-without-redundancy/#.Wp1x3TN96n8.
VMWare, "How VMware HA Works;" Feb. 15, 2016, https://web.archive.org/web/20160215231257/https://pubs.vmware.com/vsphere-4-esxvcenter/index.jsp?topic=/com.vmware.vsphere.availability.doc 41/cusehaworks.html.

\* cited by examiner

ARCHITECTURE FOR CONVERGED INDUSTRIAL CONTROL AND REAL TIME APPLICATIONS

CROSS REFERENCE TO RELATED APPLICATION

This application claims the benefit and priority of U.S. Provisional Application Ser. No. 62/540,502, filed on Aug. 2, 2017, titled "Architecture for Converged Industrial Control and Real Time Applications" which is hereby incorporated by reference in entirety, including all references and appendices cited therein.

FIELD OF INVENTION

The present disclosure is directed to fog computing.

SUMMARY

According to some exemplary embodiments, the present disclosure is directed to an architecture for converged industrial control and real time applications, the architecture comprising a physical network port, a switching module, an embedded CPU core (e.g. ARM cores), a network interface controller, and a multi-core computing module.

According to further exemplary embodiments, the physical network port is an ethernet port capable of supporting a real-time field bus. The switching module may be configured to support a multiport ethernet switch. The switching module may also be configured to enable a backplane mesh to interconnect multiple foglets. Additionally, the embedded cores may be within the switching module, and the embedded cores may be configured to support virtualization.

The network interface controller, in many exemplary embodiments, may be configured to function in either a discrete fashion or integrated with the multi-core computing module. The network interface controller may be configured to move a message that arrives as an ethernet packet or frame, and the message may arrive at a central processing unit at a predefined time. The network interface controller may be further configured to reverse a movement of the message. Additionally, the reverse movement may be processed by the central processing unit and being from a memory block to a network port.

Other exemplary methods include communicating a packet within a deterministic ethernet environment, by communicating a packet between a fognode and an endpoint and/or communicating the packet between two or more applications on a foglet.

Yet even further methods include a scheduling method for a converged, non-real time and real-time computing architecture comprising communicating, with time awareness, a message from an external endpoint to one or more deterministic ethernet switches, communicating, with time awareness, the message from the deterministic ethernet switches to a NIC module, communicating, with time awareness, the message from the NIC module to a memory, accessing, with time awareness, by a virtual machine the message in the memory, and the virtual machine determining, with time awareness, resources within the virtual machine for processing the message. Additionally, switch egress priority scheduling and IEEE TSN scheduling for communicating the message from the deterministic ethernet switch to the NIC module may be utilized. Time aware scheduling may be employed for a message to be moved from the NIC module to the memory. The memory, in some exemplary embodiments may be a cache memory and may further comprise coloring or partitioning the cache memory. In some exemplary embodiments, the method may further comprise utilizing a hypervisor to schedule timing of accessing by the virtual machine the message in the memory. Additionally, a guest operating system of the virtual machine may be used to access, with time awareness, resources across a container or an application.

A scheduling method for a converged real-time and non-real-time architecture may also be used in various exemplary embodiments, the method including communicatively coupling a NIC module to a central processing module and a network, turning by the NIC module a network packet into a message to be processed by the computing modules, and turning a processed message into a network packet, and transmitting the network packet to the network, all with time awareness. Additionally, the NIC module may be configured for re-timing and scheduling the turning of the message into the network packet. Time aware, coordinated scheduling may also be employed at the NIC module toward a central processing module memory. Hierarchical scheduling a container or an application to process the message, with time awareness may also be employed. The NIC module may be configured for aggregating packets arriving separately from different endpoints, into an aggregate message for the processing modules. Splitting aggregated packets into separate messages timed for parallel processing in processing modules may also be utilized. Additionally, the NIC module may be configured for managing time aware exchange, publishing and distribution of messages across applications.

A time aware scheduling method for a real-time architecture is also provided, which includes hosting by a NIC module a real-time data bus, and enabling offloading of message exchange activities across distributed real-time applications.

In yet even further exemplary embodiments, a scheduling method for a real-time architecture is also provided, which comprises utilizing time-aware and time-quantum based hierarchical schedulers, enabling a flexible, deterministic allocation of computing quanta across competing entities, including virtual machines, containers, and applications. Exemplary methods may further comprise utilizing a time aware hierarchical scheduler, providing flexible and deterministic allocation of computing quanta to virtual machines, providing flexible and deterministic allocation of computing quanta to containers within the virtual machines; and providing flexible and deterministic allocation of computing quanta to applications or tasks within the containers.

DESCRIPTION OF THE DRAWINGS

Certain embodiments of the present technology are illustrated by the accompanying figures. It will be understood that the figures are not necessarily to scale. It will be understood that the technology is not necessarily limited to the particular embodiments illustrated herein.

DETAILED DESCRIPTION

Figure 1:
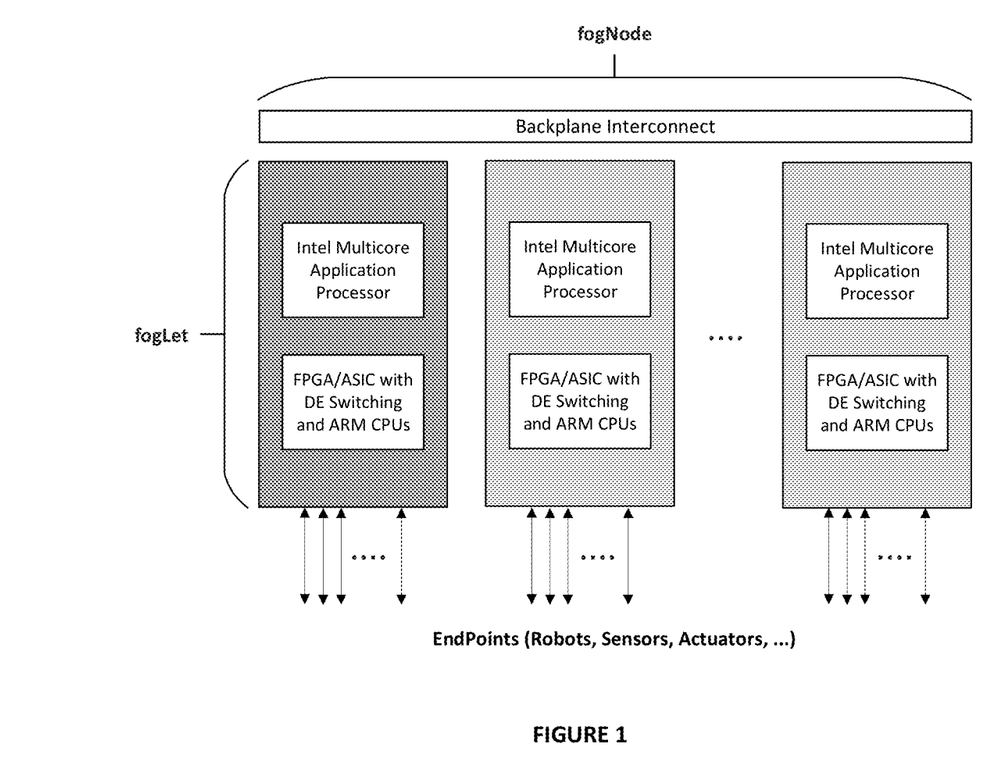
FIG. 1 is a diagram of an exemplary Fog Node System Architecture.

FIG. 1 is a diagram of an exemplary Fog Node System Architecture.

According to some exemplary embodiments, the present disclosure is directed to an architecture for converged industrial control and real time applications, the architecture comprising a physical network port, a switching module, with optional embedded cores (e.g., ARM cores), a network interface controller, and a multi-core computing module.

According to further exemplary embodiments, the physical network port is an ethernet port capable of supporting a real-time field bus. The switching module may be configured to support a multiport ethernet switch. The switching module may also be configured to enable a backplane mesh to interconnect multiple foglets. Additionally, the embedded cores may be within the switching module, and the embedded cores may be configured to support virtualization.

The network interface controller, in many exemplary embodiments, may be configured to function in either a discrete fashion or integrated with the multi-core computing module. The network interface controller may be configured to move a message that arrives as an ethernet packet or frame, and the message may arrive at a central processing unit at a predefined time. The network interface controller may be further configured to reverse a movement of the message. Additionally, the reverse movement may be processed by the central processing unit and being from a memory block to a network port.

Other exemplary methods include communicating a packet within a deterministic ethernet environment, by communicating a packet between a fog node and an endpoint and/or communicating the packet between two or more applications on a foglet.

As shown in FIG. 1, the real-time architecture of the Nebbiolo fog nodes is built around the following key elements:

Hardware architecture for each fogLet, including:

Physical network ports, mainly Ethernet ports, capable of supporting legacy real-time field busses (e.g., Ethercat or Profinet RT), as well as IEEE TSN Deterministic Ethernet (DE);

Switching module, supporting a multiport Ethernet switch, supporting IEEE TSN, and optionally enabling a backplane mesh to interconnect multiple fogLets; Embedded cores, within the switching modules, potentially supporting virtualization, and even real-time capable computing (e.g., ARM R5, A51-52, etc.);

Network interface functionality (NIC), either in a discrete fashion, or integrated with the Computing Modules; and Multi-core (x86) Computing Module.

Figure 2A:
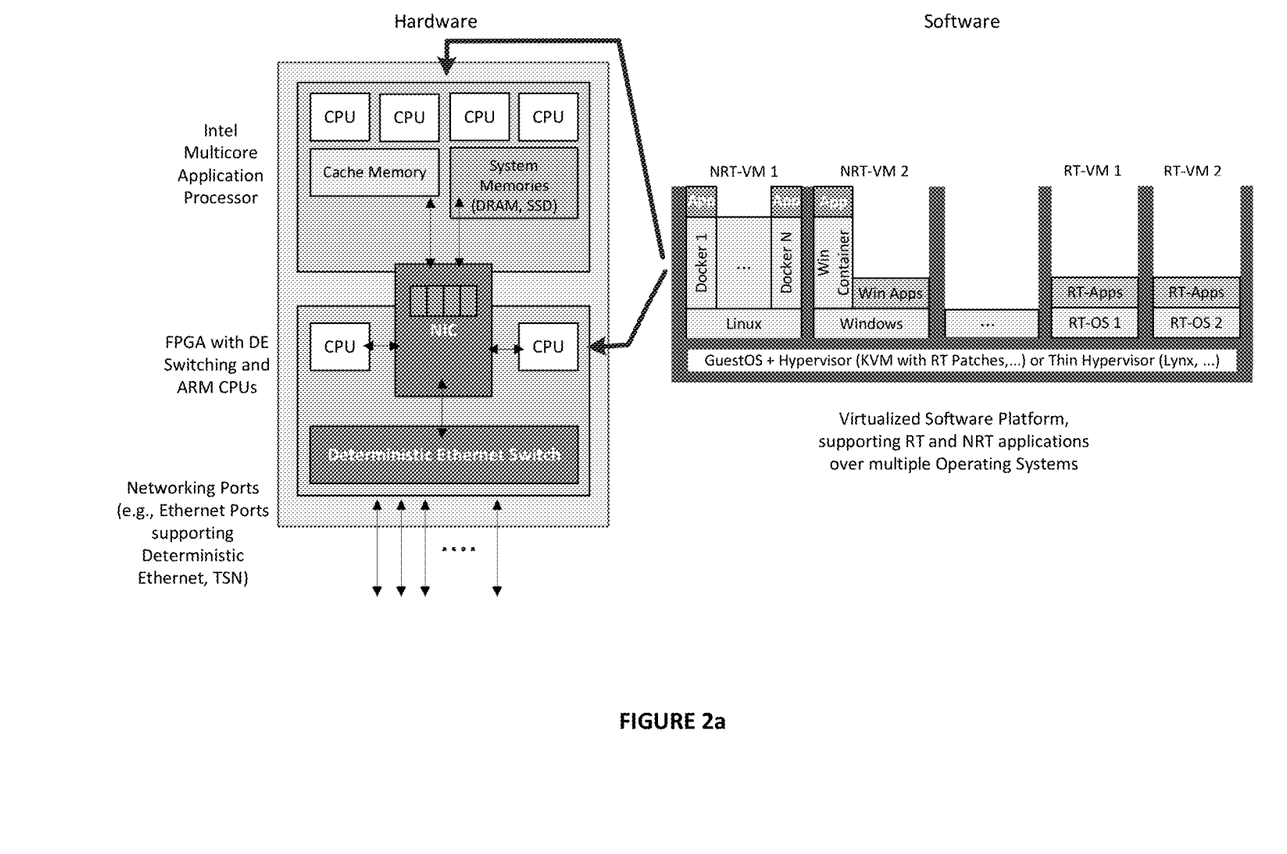
FIG. 2a is an exemplary illustration of the role of the interface between the network and the computing modules.

FIG. 2a is an exemplary illustration of the role of the interface between the network and the computing modules.

Figure 2B:
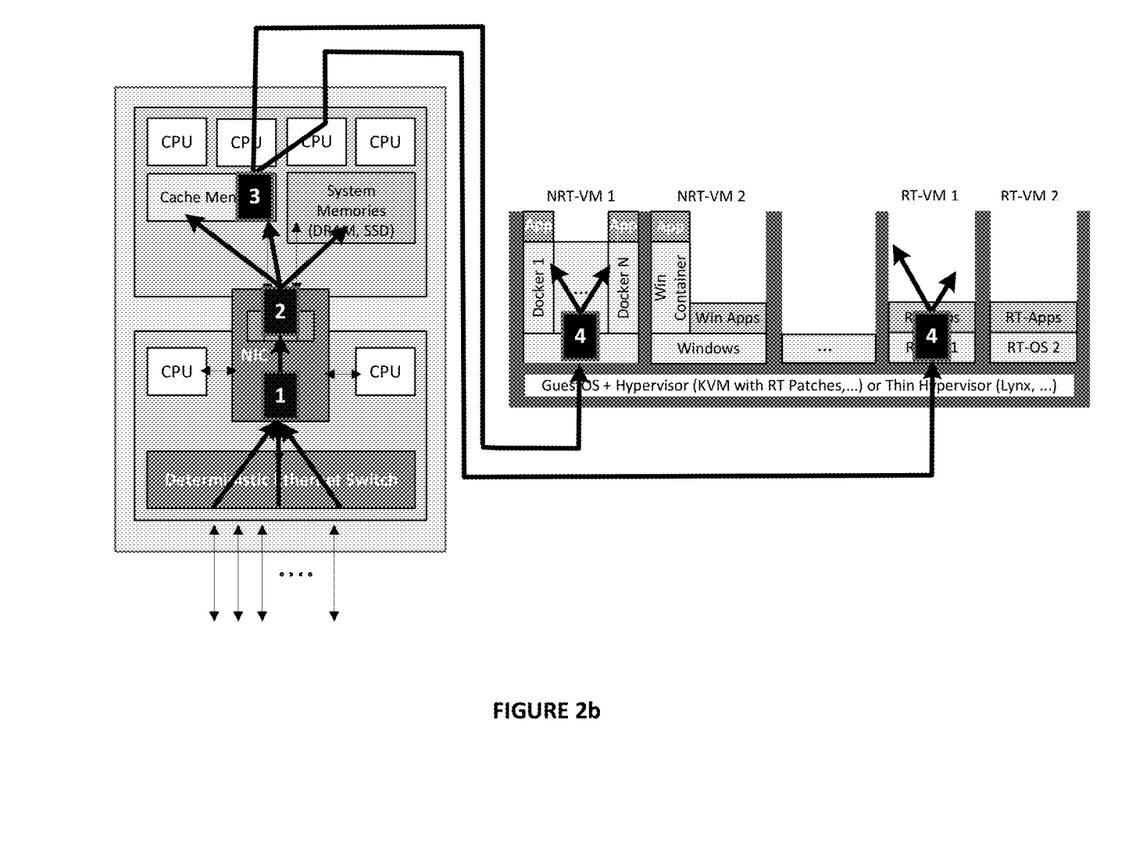
FIG. 2b is another exemplary illustration of the role of the interface between the network and the computing modules.

FIG. 2b is another exemplary illustration of the role of the interface between the network and the computing modules.

Shown in FIGS. 2a and 2b, are the particular roles of the interface between the network and the computing modules, residing in the Intel multicore module or within the lower module, as embedded processors. This functional block is known as the Network Interface Controller, NIC, and is responsible for the movement of messages, arriving as Ethernet packets, or frames, and positioned in appropriate memory locations (e.g., in Cache or System Memory), as Messages expected by the CPUs which are supposed to process them. This block is also responsible for the reverse movement of Messages, processed by the CPUs, from memory blocks within the computing modules, to the networking ports, formatted as Ethernet packets. In various exemplary embodiments, the NIC functionality is critical within the Nebbiolo real-time architecture.

According to many exemplary embodiments, communication paths, allow the deterministic transport of packets to and from the end points (sensors and actuators) and the control applications, and among real-time collaborating applications. These communication paths may include multiple segments, in the physical network, between the network and the CPU memory, and to user space, thru a hypervisor. This communication links need to strictly satisfy deterministic schedules, so that packets become available for processing in predictable time intervals.

A real-time Data Bus, also referred as Middleware, rides over the packet communication paths, enabling the interworking of collaborating applications in the Data Layer, so that applications can be decoupled from the task of distributing shared information across the set of their collaborating peers. This element could be supported in the software stack, but also brought closer to the hardware, e.g., in the FPGA module available on each fogLet.

According to many exemplary embodiments, real-time capable computing resources that offer real-time services, computing and storage, hosting real-time applications, running in virtualized environments, coexisting with non-real-time applications. Nebbiolo's fogLet architecture enables the positioning of real-time applications in various configurations, so that various modes of parallel or hierarchical collaborative computation becomes available even within each fogLet.

The various exemplary embodiments herein provide for the precise distribution of absolute timing, based on the IEEE 1588 protocol, to all relevant end-points, including sensors and actuators, networking elements, NICs, software stack, and to the hypervisor. This is enabled by the adoption of TSN, but also of its extension into the software stack. In some exemplary embodiments, this calls for modifications in the computing modules, such as those in Intel's Coordinated Computing (ICC) architecture. The precise absolute timing is fully distributed through this architecture and enables the implementation of aligned functions across the layers, and, in particular, the implementation of time-triggered hierarchical scheduling function in the hypervisor and OSs, which will be aligned with the delivery of messages to be acted upon by the applications.

The distribution of timing also allows for the extension of scheduled, deterministic aggregation and de-aggregation of packets received from the network and movement of the resulting packets to and from the computing elements memories (e.g., preferentially, Cache Memory). According to various exemplary embodiments, this communication link, involving the NIC and direct DMA functions, is not well covered by current TSN standards, and provides ample space for the introduction of novel approaches. Some of these ideas help simplify and make more efficient the processing of messages by the CPUs, for example, by combining multiple separate messages into a single "message train", which may be processed sequentially.

The next topic concerns the hierarchical scheduling of resources, such as CPU cores, or computing cycles on a CPU core, to VMs, hosting non-real-time and real-time OSs, and within each VM, to Containers, hosting applications. The precise absolute time distribution enables the definition of time-triggered scheduling algorithms, such as time wheels, allocating computing time slots (e.g., multiple of a basic time units, to each VM, or Container), leveraging a broad experience in hierarchical scheduling, developed in other field, such as ATM networking.

The flexibility and precision of the resource allocation provided by this class of time triggered hierarchical scheduling algorithms was never before available in the past. This innovative approach enables the efficient multiplexing and separation of non-real-time and real-time OSs, and across Containers and Applications with very different size tasks, requested over very different periods. For example, multiple low frequency tasks, previously assigned to dedicated, low power controllers or CPUs, can now be effectively multiplexed over a more powerful computer, completing each task much sooner, and thus capable of hosting multiple such low frequency tasks, or control loops.

The real-time middleware (RT Data Bus) governs data exchanges among collaborating applications across the architecture. In the real-time architecture, in order to simplify the development of collaborating applications, and in order to efficiently separate and accelerate key functional elements of the overall architecture, a clear and clean separation of the real-time middleware governing the data exchanges across collaborating applications is utilized. According to various exemplary embodiments, two major options for the real-time Data Bus may be utilized. In the first option, the Data Bus is implemented in software, in the second, it is implemented closer to the hardware, within the FPGA on a fogLet. An FPGA implementation has clear efficiency advantages, and offload the CPUs. It may be the best solution in case even the networking level communication is delegated to the internal switch on the fogLet. A software implementation is however more flexible and portable.

The shared Data registers, according to various exemplary embodiments, are logically part of Data Bus functionality, but are accessible by the applications as if local Data. The RT Data Bus then provides deterministic Data exchange services, by supporting a variety of session types, including Publish-Subscribe, Broadcasting, but also exchanges and updates of Data simultaneously modified by multiple applications. The RT Data Bus would provide in such cases Consistency and Coherency support. A special but rather limited example of a real-time Data Bus is OPC UA over TSN. Another, rather cumbersome, is provided by Data Distribution Systems (DDS), such as those commercialized by RTI and PrismTech. A more promising one is being developed by CubeFog.

In a successful real-time architecture, built on a complete distribution of the absolute time, challenges mainly come in the form of resource contention at every point where the resource demand may be larger than the pool of available resources. Here, resources may be communications bandwidth and transmission intervals, memory locations, and computing resources.

In a time-aware, or time-triggered system such as the one considered here, time-aware scheduling may serve as a tool to address possible resource contention, and to coordinate appropriately the resource requests.

The overall scheduling of all the resources in this complex system will necessarily resort to a divide and conquer approach, breaking down the overall problem into smaller scheduling problems, addressing separately the allocation of specific resources at individual contention points, and then providing a coordinated, aggregate scheduler to harmonize and align the individual resource schedulers. This clearly leads to a hierarchical scheduling approach.

In many exemplary embodiments, consideration is first made of the contention point found on the path between an external endpoint, or machine, to the control application on the virtualized computing complex. The list of contention and potential scheduling opportunities on the way "in" includes Ethernet frame contention out of the internal switch port serving the NIC module. This contention should be resolved via switch egress port priority scheduling and TSN scheduling.

NIC to CPU Memory transfer contention, involving decision of which message will be moved, and when, to one of the possible memory destinations is available is taken into account. If Cache memory is used, because of its speed advantages, it should be "colored", or partitioned, to prevent overwriting of portions of the Cache by other contending entities.

Contention and timing across VMs, to access the messages deposited in memory, and to process such messages is taken into account. This scheduling is executed by the Hypervisor.

Contention, within a VM, for resources across the various Containers and Applications running within that VM is taken into account.

Figure 3:
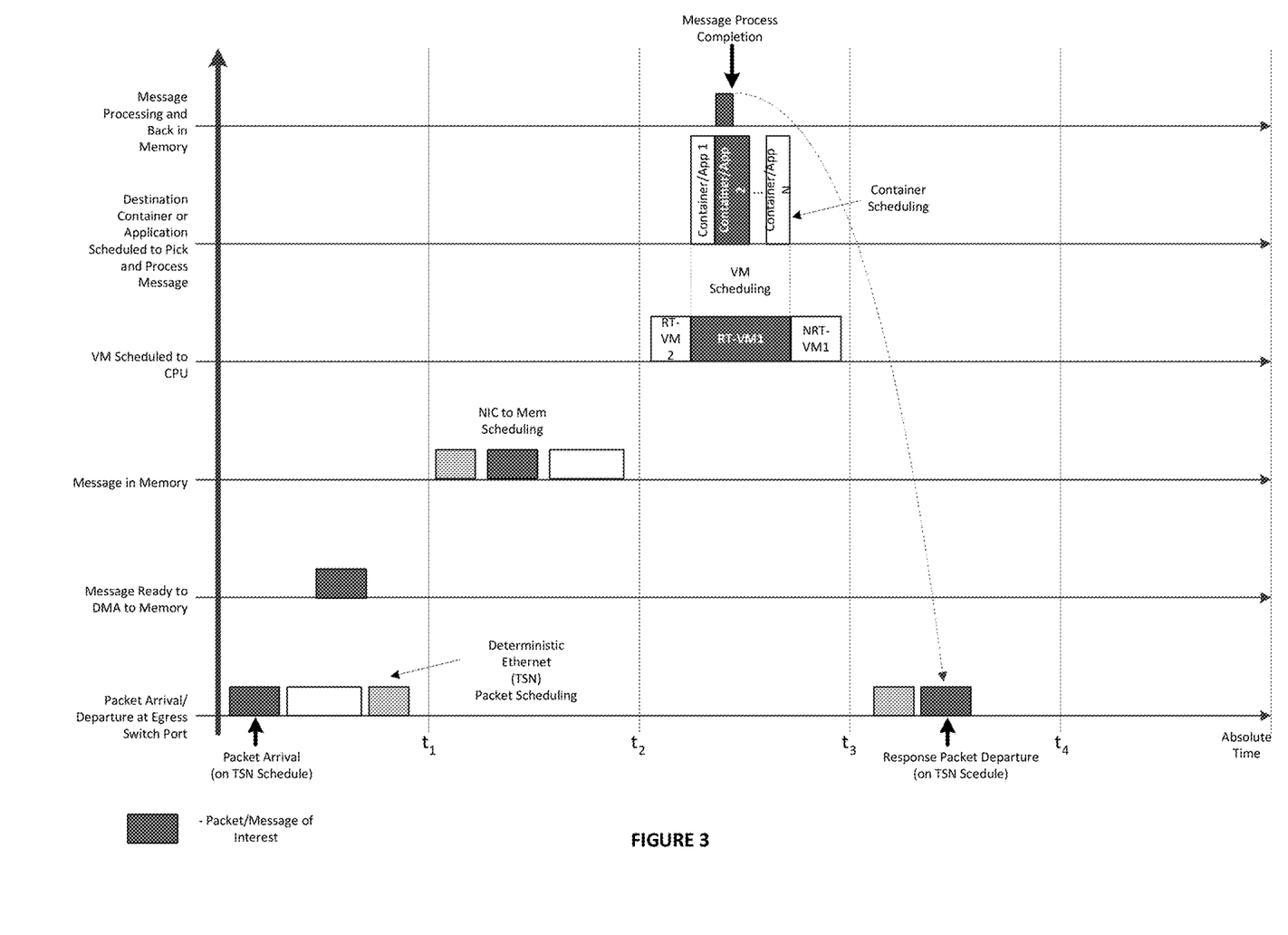
FIG. 3 is an exemplary illustration of the sequence of scheduling decisions.

FIG. 3 is an exemplary illustration of the sequence of scheduling decisions.

FIG. 3 illustrates the sequence of scheduling decisions, all based on a full, distributed awareness of the absolute time, required between the receipt of a scheduled packet from the network, to the transmission into the network of the response packet, after processing of the corresponding message by a Container, within a Virtual Machine, on a specific CPU in the multicore module.

Figure 4:
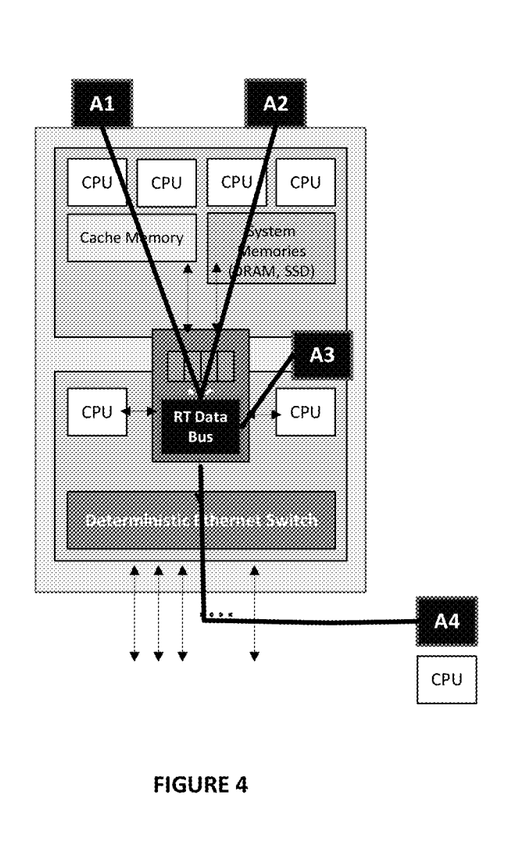
FIG. 4 is another exemplary illustration of the sequence of scheduling decisions.

FIG. 4 is another exemplary illustration of the sequence of scheduling decisions.

FIG. 4 illustrates techniques applicable to the NIC functional block, which offers vast opportunities at the boundary between the CPU modules and the network, including the following list of techniques:

Packet-to-Message Scheduling. Re-timing and scheduling at the NIC module is an optional function as messages are turned into network packets, and transmitted into the network (e.g., in TT Ethernet NIC functionality). However, a similar behavior may be very advantageous when packets, turned into messages for CPU processing, are timed, shaped and in general scheduled towards the Memory. As an example, a strict coordination of scheduling at the NIC towards the CPU memory with hierarchical scheduling of the container or application that will process the messages, may produce much better real-time performance. This coordination may be a task for the scheduler at a higher level of the scheduling hierarchy.

Packet-to-Message Aggregation and Re-timing, with the goal of optimizing real-time message processing. The concept is that while packets may arrive separately from different endpoints, they could be aggregated by the NIC module into a unified combination message, end sent up for processing by the same application in an aggregate way, thus easing the scheduling task. Naturally, de-aggregation of the response messages may be required on the reverse path through the NIC.

Packet-to-Message De-aggregation and Re-timing. This technique involves the splitting of a combination packet, including messages from different endpoints (e.g., positioned in a ring topology, such as EtherCat), that may be processed by different Containers in parallel within the multicore complex. The combination packet would be split into its component messages, which would be scheduled for processing independently, but with the awareness that the individual response messages would be collected and combined into a unified combination packet on the way back to the various endpoints.

Message Real-Time Bus (Middleware). This functionality, managing the exchange, publishing and even consistent and collaborative distribution of messages across applications may be fruitfully positioned within the NIC block. This positioning may be the most architecturally efficient. Also, the option of an implementation of the Real-time Message Bus functionality with the FPGA would offer even more acceleration and also offload this function away from the software stack.

With respect to resource management techniques relevant to the contention occurring within the multicore module, across CPU, VMs and Containers, it is well understood that one of the key weaknesses in current Operating Systems, particularly in virtualized environments, towards the support of real-time, deterministic activities, is the limitation imposed by current, time-unaware schedulers.

With a full distribution of the absolute time within this architecture, consideration may be made about adopting time-aware, and time-quantum based hierarchical schedulers, enabling a flexible, deterministic allocation of computing quanta across the many competing entities, and, specifically, to VMs and Containers.

Figure 5A:
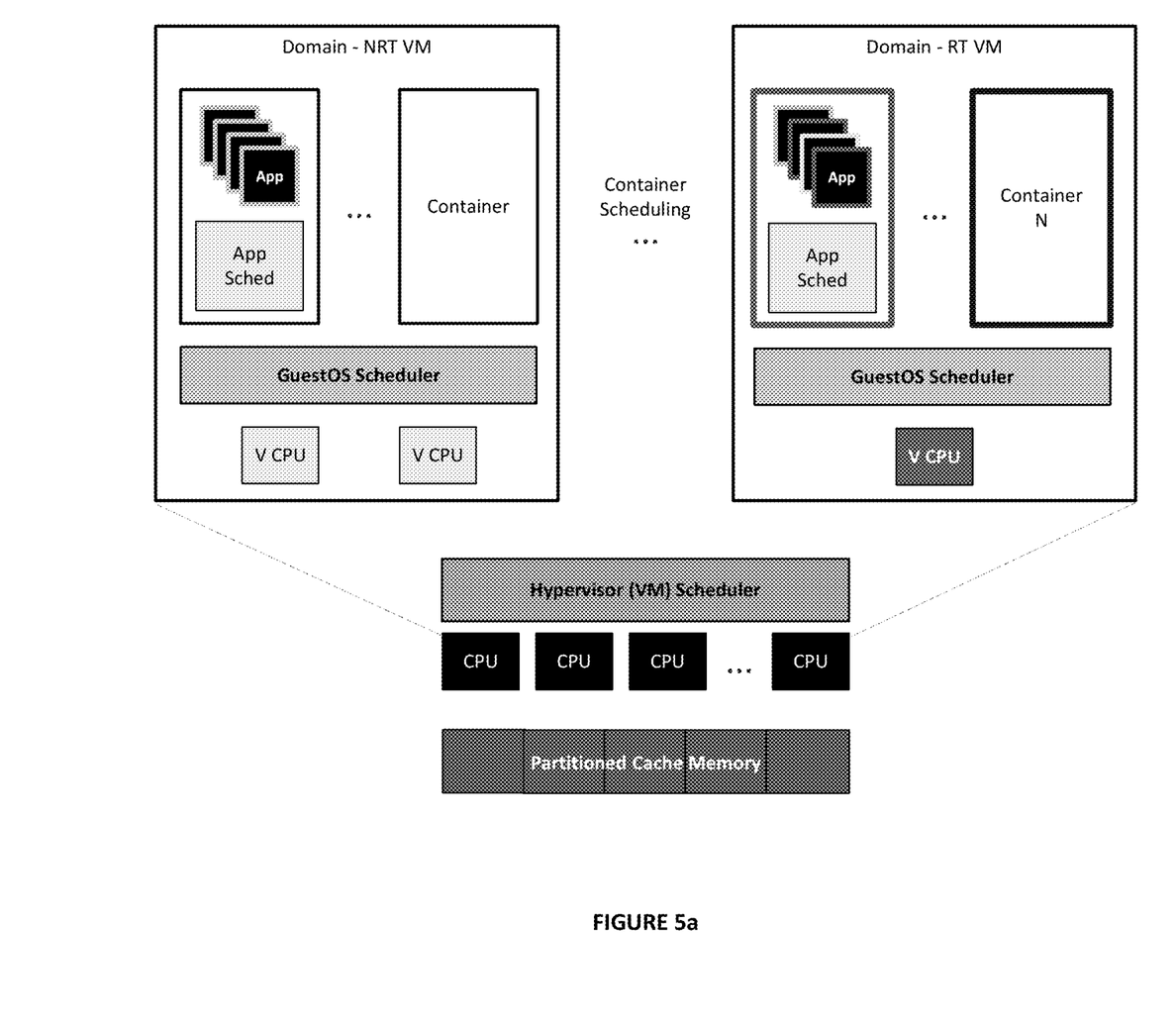
FIG. 5a shows an exemplary architecture for a time-aware or triggered hierarchical scheduler.

FIG. 5a shows an exemplary architecture for a time-aware or triggered hierarchical scheduler.

Figure 5B:
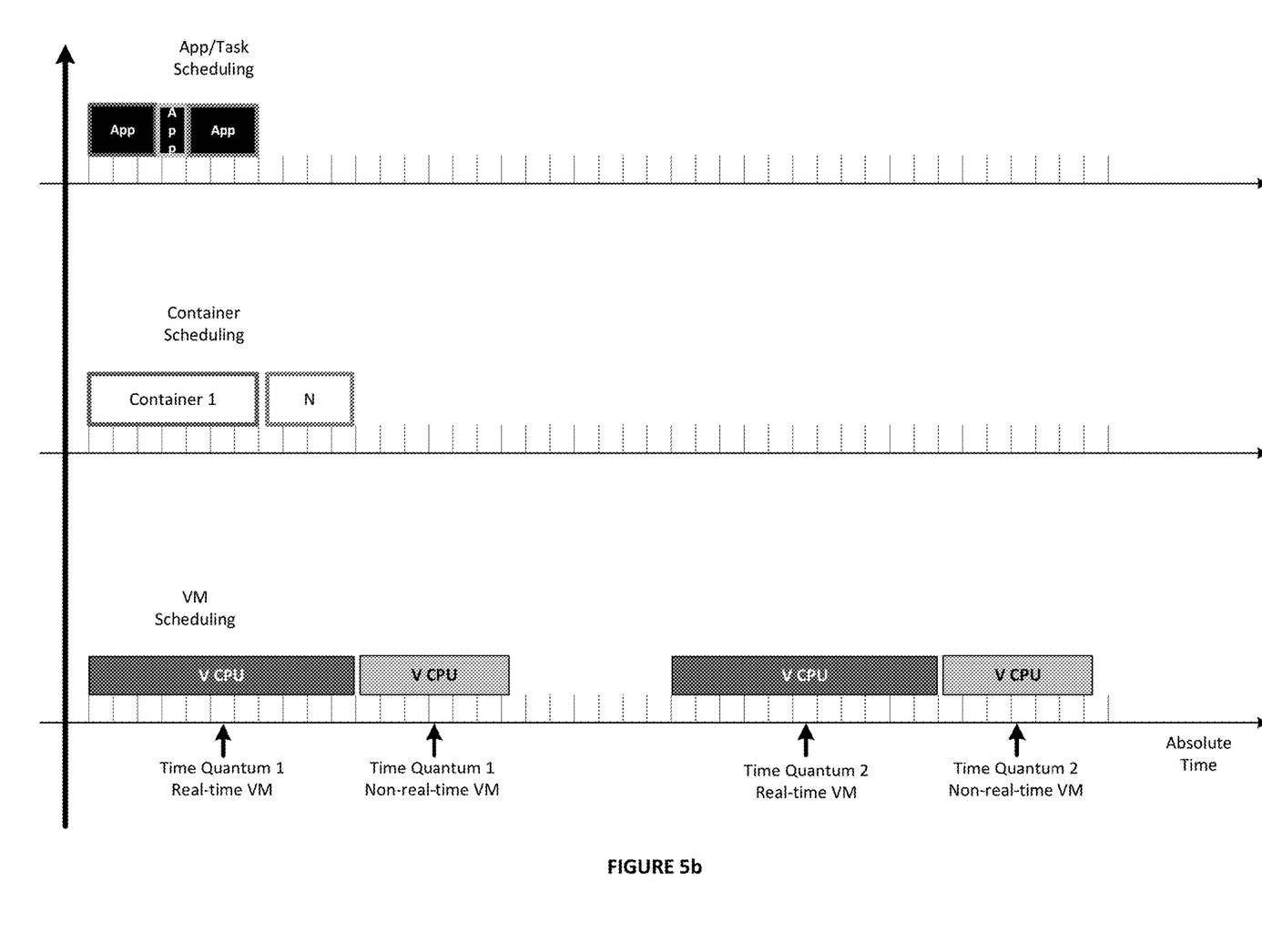
FIG. 5b shows an exemplary method for time-aware or triggered hierarchical scheduling.

FIG. 5b shows an exemplary method for time-aware or triggered hierarchical scheduling.

As illustrated by the above figures, a Time-Aware, or Triggered Hierarchical Scheduler provides flexible and deterministic allocation of computing quanta to VMs, then to Containers within such VMs, then to Applications or Tasks, within such Containers. Three levels of scheduling are shown, first across VMs, then across Containers, and then across tasks within a Container.

In various exemplary embodiments, the allocation of a sequence of constant length computing time quanta $Q_i$ to the VM i, i, 1, 2, ... N, will be based on Weighted Fair Queueing Scheduling, based on the selection of weight, $W_i$, which will determine, together with the quanta, the allocation of the overall computing bandwith available on a processor, based on the formula: $W_i Q_i / \Sigma (W_j Q_j) <= 1$, where the summation in the denominator goes from 1 to N.

The decision about the next VM to receive its quantum of computing will be based on selecting the VM characterized by the minimum of a specific time-stamp, the Virtual Finishing Time, VF, for its next quantum, k, where the Virtual Finishing Time of quantum k of VM j, $VF_{j,k}$, is defined as: $VF_{j,k} = VS_{j,k} + Q_j/W_j$, where $VS_{j,k}$ is the Starting Virtual Time for k-th quantum of VM j.

The formula above determines a sequence of quanta allocated to the various VMs. Assumed here that the quanta associated to the real-time VMs are allocated without the possibility of preemption, and are allocated even if no work for that VM is available (in non-work conserving mode). However, for non-real time VMs, it is assume that, in case no work is available for the selected non-real-time VM, then the next non-real-time VM with minimum Virtual Finishing Time is selected (in work conserving mode). Preemption from the next real-time VM may occur, and the unfinished quantum will be completed upon the next allocation (details to be completed).

Once a VM is taking hold of the CPU for its quantum, the next scheduling phase will take place across Containers in the VM. A similar Weighted Fair Queuing scheduling algorithm, as described in a. above, can be adopted here. The same consideration holds for the next level of scheduling, across tasks in a given Container. Again, it is assumed preemption applies to real-time Containers and tasks. Also, scheduling in the whole real-time hierarchy is assumed to be non-work-conserving.

Nebbiolo's Fog Computing Platform includes, besides hardware and software systems, the fogNodes running fogOS, capable of supporting real-time together with non-real-time activities within their fogLets, also provides a Centralized Management component, the fog System Manager, as shown in the following figure. In the context of the manifestation of a complete real-time architecture, the fogSM plays a role, as the seat for the orchestration of the overall scheduling, across all the contention points in the architecture.

From the perspective of the fogSM, the following scheduling components may be orchestrated towards the success of the overall real-time architecture:

Network connectivity and quality of service;
TSN packet scheduling across the network;
Application placement across the architecture;
NIC resource allocation and scheduling;
VM scheduling, Container scheduling, and task scheduling; and
Redundancy support for the real-time architecture.

The overall orchestration across a broad real-time architecture such as the one proposed here offers great opportunity to introduce novel and highly effective techniques.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computer-implemented method for flexible and deterministic allocation of computing quanta to a plurality of real time virtual machines and non-real time virtual machines, said method comprising the following computer-implemented steps:

triggering a computer-based processor to identify an overall computing bandwidth available thereon for allocation to each of said plurality of real time virtual machines and each of said plurality of non-real time virtual machines, by executing a programmatic representation of a first formula:

$W_iQ_i/\Sigma(W_jQ_j)<=1$, wherein $W_i$ is weight at a quantum 'i', $Q_i$ is computing quanta at said quantum 'i', $W_j$ is weight at a quantum 'j', and $Q_j$ is computing quanta at said quantum 'j';

triggering said processor to select at least one real time virtual machine from said plurality of real time virtual machines for allocation of said computing bandwidth, based at least on a virtual finishing time (VF) associated with said at least one real time virtual machine at a quantum 'k', and wherein said virtual finishing time at said quantum 'k' is determined by said processor based on an execution of a second formula:

$VF_j,k=VS_j,k+Q_j/W_j$, wherein $VS_j,k$ is a starting virtual time (VS) for said quantum 'j';

triggering said processor to determine a sequence of computing quanta allocatable to each of said plurality of real time virtual machines, without preemption, based on said second formula;

triggering said processor to iteratively calculate, based on said second formula, said virtual finishing time (VF) corresponding to each of said plurality of non-real time virtual machines at each pre-determined quantum, and further triggering said processor to iteratively select from amongst said non-real time virtual machines, a non-real time virtual machine having a minimum virtual finishing time at said each pre-determined quantum; and triggering said processor to assign said computing bandwidth to said non-real time virtual machine selected as having said minimum virtual finishing time at said each pre-determined quantum.

2. The method as claimed in claim 1, wherein the method further includes the step of triggering said processor to select at least one real time virtual machine from said plurality of real time virtual machines for allocation of said computing bandwidth, based at least on a virtual finishing time (VF), further includes the step of triggering said processor to select said at least one real time virtual machine based on said minimum virtual finishing time.

3. The method as claimed in claim 1, wherein the step of triggering said processor to assign said computing bandwidth to said non-real time virtual machine, further includes the step of triggering said processor to assign said computing bandwidth to said non-real time virtual machine, with said preemption.

4. The method as claimed in claim 1, wherein the method further includes the following steps:

triggering said processor to implement said first formula on a plurality of containers executed within each of said plurality of real-time virtual machines and non-real time virtual machines;

triggering said processor to identify said overall computing bandwidth available thereon for allocation to each of said plurality of containers executed within each of said plurality of real-time virtual machines and said non-real time virtual machines;

triggering said processor to implement said second formula on said plurality of containers executed within each of said real time virtual machines;

triggering said processor to select, based on implementation of said second formula on each of said plurality of containers executed within each of said real time virtual machines, at least one container for allocation of said computing bandwidth, based at least on a virtual finishing time (VF) associated with said at least one container at a quantum 'k', and wherein said virtual finishing time at said quantum 'k' is determined by said processor based on an execution of said second formula;

triggering said processor to determine said sequence of quanta allocated to each of said plurality of containers executed within each of said real time virtual machines without preemption, based on said second formula;

triggering said processor to iteratively calculate, based on said second formula, said virtual finishing time (VF) corresponding to said plurality of containers executed within each of said plurality of non-real time virtual machines at each pre-determined quantum, and further triggering said processor to iteratively select from amongst said containers executed within each of said plurality of non-real time virtual machines, a container having a minimum virtual finishing time at said each pre-determined quantum; and triggering said processor to assign said computing bandwidth with said preemption to said container having said minimum virtual finishing time at said each pre-determined quantum.

5. The method as claimed in claim 4, wherein the step of triggering said processor to assign said computing bandwidth to said container having said minimum virtual finishing time at said each pre-determined quantum, further includes the step of triggering said processor to assign said computing bandwidth with said preemption.

6. The method as claimed in claim 1, wherein the method further includes the step of triggering said non-real time virtual machine and said at least one real time virtual machine allocated with said computing bandwidth, to process with time awareness at least one aggregated message transmitted from an NIC module.

7. The method as claimed in claim 6, wherein the method further includes the step of configuring said NIC module to selectively aggregate network packets transmitted from a plurality of endpoints into said aggregated message, and further configuring said NIC module to selectively split said aggregated message into a plurality of separate messages timed for parallel processing in said non-real time virtual machine and said at least one real time virtual machine allocated with said computing bandwidth.

8. A computer-implemented system for flexible and deterministic allocation of computing quanta to a plurality of real time virtual machines and non-real time virtual machines, said system comprising:

a processor;

a memory module communicably coupled to said processor, said memory module storing computer program code, wherein said memory module and said computer program code stored therein are configured, with said processor, to:

identify an overall computing bandwidth available thereon for allocation to each of said plurality of real time virtual machines and each of said plurality of non-real time virtual machines, by executing a programmatic representation of a first formula:

$W_iQ_i/\Sigma(W_jQ_j)<=1$, wherein $W_i$ is weight at a quantum 'i', $Q_i$ is computing quanta at said quantum 'i', $W_j$ is weight at a quantum 'j', and $Q_j$ is computing quanta at said quantum 'j';

select at least one real time virtual machine from said plurality of real time virtual machines for allocation of said computing bandwidth, based at least on a virtual finishing time (VF) associated with said at least one real time virtual machine at a quantum 'k', and wherein said virtual finishing time at said quantum 'k' is determined by said processor based on an execution of a second formula:

$$VF_j,k=VS_j,k+Q_j/W_j,$$

wherein $VS_j,k$ is a starting virtual time (VS) for said quantum 'j';

determine a sequence of computing quanta allocatable to each of said plurality of real time virtual machines, without preemption, based on said second formula;

iteratively calculate, based on said second formula, said virtual finishing time (VF) corresponding to each of said plurality of non-real time virtual machines at each pre-determined quantum, and further triggering said processor to iteratively select from amongst said non-real time virtual machines, a non-real time virtual machine having a minimum virtual finishing time at said each pre-determined quantum; and assign said computing bandwidth to said non-real time virtual machine selected as having said minimum virtual finishing time at said each pre-determined quantum.

9. The system as claimed in claim 8, wherein said processor is further configured to select at least one real time virtual machine from said plurality of real time virtual machines for allocation of said computing bandwidth, based at least on said minimum virtual finishing time.

10. The system as claimed in claim 8, wherein said processor is further configured to assign said computing bandwidth to said non-real time virtual machine, with said preemption.

11. The system as claimed in claim 8, wherein said processor is further configured to:

implement said first formula on a plurality of containers executed within each of said plurality of real-time virtual machines and non-real time virtual machines;

identify said overall computing bandwidth available thereon for allocation to each of said plurality of containers executed within each of said plurality of real-time virtual machines and said non-real time virtual machines;

implement said second formula on said plurality of containers executed within each of said real time virtual machines;

select, based on implementation of said second formula on each of said plurality of containers executed within each of said real time virtual machines, at least one container for allocation of said computing bandwidth, based at least on a virtual finishing time (VF) associated with said at least one container at a quantum 'k', and wherein said virtual finishing time at said quantum 'k' is determined by said processor based on execution of said second formula;

determine said sequence of quanta allocated to each of said plurality of containers executed within each of said real time virtual machines without preemption, based on said second formula;

iteratively calculate, based on said second formula, said virtual finishing time (VF) corresponding to said plurality of containers executed within each of said plurality of non-real time virtual machines at each pre-determined quantum, and iteratively select from amongst said containers executed within each of said plurality of non-real time virtual machines, a container having a minimum virtual finishing time at said each pre-determined quantum; and assign said computing bandwidth, with said preemption to said container having said minimum virtual finishing time at said each pre-determined quantum.

12. The system as claimed in claim 8, wherein said processor is further configured to trigger said non-real time virtual machine and said at least one real time virtual machine allocated with said computing bandwidth, to process with time awareness at least one aggregated message distributed from an NIC module, and wherein said NIC module is configured to selectively aggregate network packets transmitted from a plurality of endpoints to create said aggregated message, and selectively split said aggregated message into a plurality of separate messages timed for parallel processing in said non-real time virtual machine and said at least one real time virtual machine allocated with said computing bandwidth.

13. A non-transitory computer-readable storage medium having computer-executable instructions stored thereon, said computer-executable instructions, when executed by a computer-based processor, cause said processor to:

identify an overall computing bandwidth available thereon for allocation to each of said plurality of real time virtual machines and each of said plurality of non-real time virtual machines, by executing a programmatic representation of a first formula:

$$W_iQ_i/\Sigma(W_jQ_j)<=1,$$

wherein $W_i$ is weight at a quantum 'i', $Q_i$ is computing quanta at said quantum 'i', $W_j$ is weight at a quantum 'j', and $Q_j$ is computing quanta at said quantum 'j';

select at least one real time virtual machine from said plurality of real time virtual machines for allocation of said computing bandwidth, based at least on a virtual finishing time (VF) associated with said at least one real time virtual machine at a quantum 'k', and wherein said virtual finishing time at said quantum 'k' is determined by said processor based on an execution of a second formula:

$$VF_j,k=VS_j,k+Q_j/W_j,$$

wherein $VS_j,k$ is a starting virtual time (VS) for said quantum 'j';

determine a sequence of computing quanta allocatable to each of said plurality of real time virtual machines, without preemption, based on said second formula;

iteratively calculate, based on said second formula, said virtual finishing time (VF) corresponding to each of said plurality of non-real time virtual machines at each pre-determined quantum, and further triggering said processor to iteratively select from amongst said non-real time virtual machines, a non-real time virtual machine having a minimum virtual finishing time at said each pre-determined quantum; and assign said computing bandwidth to said non-real time virtual machine selected as having said minimum virtual finishing time at said each pre-determined quantum.

14. The computer-executable instructions as claimed in claim 13, wherein said computer-executable instructions, when executed by said processor, further cause said processor to:

select at least one real time virtual machine from said plurality of real time virtual machines for allocation of said computing bandwidth, based at least on said minimum virtual finishing time;

assign said computing bandwidth to said non-real time virtual machine, with said preemption;

implement said first formula on a plurality of containers executed within each of said plurality of real-time virtual machines and non-real time virtual machines;

identify said overall computing bandwidth available thereon for allocation to each of said plurality of containers executed within each of said plurality of real-time virtual machines and said non-real time virtual machines;

implement said second formula on said plurality of containers executed within each of said real time virtual machines;

select, based on implementation of said second formula on each of said plurality of containers executed within each of said real time virtual machines, at least one container for allocation of said computing bandwidth, based at least on a virtual finishing time (VF) associated with said at least one container at a quantum 'k', and wherein said virtual finishing time at said quantum 'k' is determined by said processor based on execution of said second formula;

determine said sequence of quanta allocated to each of said plurality of containers executed within each of said real time virtual machines, without preemption, based on said second formula;

iteratively calculate, based on said second formula, said virtual finishing time (VF) corresponding to said plurality of containers executed within each of said plurality of non-real time virtual machines at each pre-determined quantum, and iteratively select from amongst said containers executed within each of said plurality of non-real time virtual machines, a container having a minimum virtual finishing time at said each pre-determined quantum;

assign said computing bandwidth, with said preemption to said container having said minimum virtual finishing time at said each pre-determined quantum;

trigger said non-real time virtual machine and said at least one real time virtual machine allocated with said computing bandwidth, to process with time awareness at least one aggregated message transmitted from an NIC module; and configuring said NIC module to selectively aggregate separate network packets into said aggregated message, and further configuring said NIC module to selectively split said aggregated message into a plurality of separate messages timed for parallel processing in said non-real time virtual machine and said at least one real time virtual machine allocated with said computing bandwidth.

\* \* \* \* \*